US007353500B2

(12) United States Patent
Ioku et al.

(10) Patent No.: US 7,353,500 B2
(45) Date of Patent: Apr. 1, 2008

(54) SUPPRESSING EXECUTION OF MONITORING MEASUREMENT PROGRAM POINTED TO BY INSERTED BRANCH AFTER THRESHOLD NUMBER OF COVERAGE TO REDUCE INSTRUCTION TESTING OVERHEAD

(75) Inventors: Akira Ioku, Tokyo (JP); Motoaki Satoyama, Sagamihara (JP); Tatsuo Isobe, Yokohama (JP); Koji Doi, Yokohama (JP); Minoru Koizumi, Tokyo (JP)

(73) Assignee: Hitachi Software Engineering Co., Ltd., Yokohama-Shi (JP)

( * ) Notice: Subject to any disclaimer, the term of this patent is extended or adjusted under 35 U.S.C. 154(b) by 107 days.

(21) Appl. No.: 11/118,399

(22) Filed: May 2, 2005

(65) Prior Publication Data

US 2005/0273666 A1   Dec. 8, 2005

(30) Foreign Application Priority Data

May 27, 2004   (JP) .............................. 2004-157216

(51) Int. Cl.
G06F 11/34   (2006.01)
(52) U.S. Cl. .......................... 717/127; 712/227; 714/38
(58) Field of Classification Search ...................... None
See application file for complete search history.

(56) References Cited

U.S. PATENT DOCUMENTS 3,473,154 A * 10/1969 Bahrs et al. ................... 714/45

| 6,418,530 B2 * | 7/2002 | Hsu et al. ................... 712/237 |
| 2005/0060521 A1 * | 3/2005 | Wang ........................ 712/227 |
| 2005/0155022 A1 * | 7/2005 | DeWitt et al. .............. 717/131 |

FOREIGN PATENT DOCUMENTS

| JP | 5 324 402 | 12/1993 |
| JP | 5 334 126 | 12/1993 |
| JP | 10 320 190 | 12/1998 |

* cited by examiner

Primary Examiner—Kenneth S. Kim
(74) Attorney, Agent, or Firm—Antonelli, Terry, Stout & Kraus, LLP.

(57)   ABSTRACT

In a method for testing a program, repeated measurement on branches that are frequently taken is prevented, thereby avoiding unnecessary overhead. An information processing device includes a coverage measurement control program for determining whether the number of times an instruction of a measurement target program has been executed due to execution of the measurement target program is equal to or larger than the maximum allowable number of measurements set for the instruction; and a coverage measurement program for incrementing a value in a field for the instruction by one to indicate the number of times the instruction has been executed, the coverage measurement program being called if the number of times the instruction has been executed is smaller than the maximum allowable number of measurements.

9 Claims, 5 Drawing Sheets

FIG. 2

12 MEASUREMENT TARGET PROGRAM

```
LABEL001:
   INSTRUCTION CODE 1
   INSTRUCTION CODE 2
   INSTRUCTION CODE 3    (JUMP INSTRUCTION TO COVERAGE MEASUREMENT CONTROL PROGRAM 16)
   INSTRUCTION CODE 4    (CONDITIONAL JUMP INSTRUCTION: ONLY WHEN TRUE, GO TO LABEL002)
   INSTRUCTION CODE 5

LABEL002:
   INSTRUCTION CODE 6
```

FIG. 3

12 MEASUREMENT TARGET PROGRAM (ORIGINAL)

```
LABEL001:
   INSTRUCTION CODE 1
   INSTRUCTION CODE 2
   INSTRUCTION CODE 4    (CONDITIONAL JUMP INSTRUCTION: ONLY WHEN TRUE, GO TO LABEL002)
   INSTRUCTION CODE 5

LABEL002:
   INSTRUCTION CODE 6
```

FIG. 4

12 MEASUREMENT TARGET PROGRAM (PRIOR ART)

LABEL001:
  INSTRUCTION CODE 1
  INSTRUCTION CODE 2
  INSTRUCTION CODE 3   (JUMP INSTRUCTION TO COVERAGE MEASUREMENT PROGRAM)
  INSTRUCTION CODE 4   (CONDITIONAL JUMP INSTRUCTION: ONLY WHEN TRUE, GO TO LABEL002)
  INSTRUCTION CODE 5

LABEL002:
  INSTRUCTION CODE 6

FIG. 5

17 MEASUREMENT RECORD TABLE

| MEASUREMENT POINT NUMBER | ADDRESS | INSTRUCTION CODE NUMBER | BRANCH | PASS COUNT |
|---|---|---|---|---|
| 1 | 00010000H | INSTRUCTION CODE 4 | TRUE (JUMP) | 1 |
|  | 00010000H | INSTRUCTION CODE 4 | FALSE (NOT JUMP) | 0 |
| 2 | ⋮ | ⋮ | ⋮ | ⋮ |

18 MEASUREMENT CONDITION SETTING TABLE

| MEASUREMENT POINT NUMBER | ADDRESS | INSTRUCTION CODE NUMBER | BRANCH | MAXIMUM ALLOWABLE NUMBER OF MEASUREMENTS |
|---|---|---|---|---|
| 1 | 00010000H | INSTRUCTION CODE 4 | TRUE (JUMP) | 1 |
|  | 00010000H | INSTRUCTION CODE 4 | FALSE (NOT JUMP) | 1 |
|  | ⋮ | ⋮ | ⋮ | ⋮ |

| REPEATED-MEASUREMENT-AT-ALL-POINTS FLAG | OFF |
|---|---|

186

SUPPRESSING EXECUTION OF MONITORING MEASUREMENT PROGRAM POINTED TO BY INSERTED BRANCH AFTER THRESHOLD NUMBER OF COVERAGE TO REDUCE INSTRUCTION TESTING OVERHEAD

CLAIM OF PRIORITY

The present application claims priority from Japanese application P2004-157216 filed on May 27, 2004, the content of which is hereby incorporated by reference into this application.

FIELD OF THE INVENTION

The present invention relates to a technique of testing a program that is executed by an information processing apparatus.

BACKGROUND OF THE INVENTION

Coverage measurement tools have been used to improve the quality of software and thereby prevent software failure. Conventional techniques for coverage measurement tools are described in, e.g., Japanese Patent Laid-open Nos. 5-334126 (Patent Document 1), 5-324402 (Patent Document 2), and 10-320190 (Patent Document 3).

A description will be given below of conventional coverage measurement techniques disclosed in these patent publications. It should be noted that even through some documents use the term "coverage analyzer" to refer to a tool for performing coverage measurement, this specification uses the term "coverage measurement tool" instead.

Coverage measurement tools have been used to check the quality of complete software. Coverage measurement tools have the so-called C0 coverage function and C1 coverage function. The C0 coverage function checks whether memory has been accessed by the program under test, while the C1 coverage function checks which branch of a conditional branch instruction of the program under test has been taken.

The C0 coverage is calculated based on the total number of instructions (or lines) to be executed in the program and the number of instructions (or lines) actually executed when the program was executed. The C1 coverage, on the other hand, is calculated based on the total number of branches to be taken in the program and the number of branches actually taken when the program was executed.

That is:

C0 coverage (%)=(number of instructions actually executed)/(total number of instructions to be executed)×100, and C1 coverage (%)=(number of branches actually taken)/(total number of branches to be taken)×100.

Referring to FIG. 3, in C0 coverage measurement, if execution of a conditional branch instruction in the program under test causes the FALSE branch of the instruction to be taken, the coverage test fails to check the TRUE branch. This means that the test may be able to check only either the TRUE branch or FALSE branch. In the case of C1 coverage measurement, on the other hand, both branches can be comprehensively checked.

A description will be given below of an exemplary method for achieving coverage measurement, specifically C1 coverage measurement. When the program to be tested includes a conditional branch instruction (such as the instruction code 4 shown in FIG. 3), the compiler, assembler, etc. for the source program inserts a jump instruction (or possibly a software interrupt instruction) at a point immediately before the conditional branch instruction in order to jump to coverage measurement program code for performing C1 coverage measurement on the conditional branch instruction. (The instruction code 3 shown in FIG. 4 is the inserted jump instruction code.) When the program shown in FIG. 4 is executed, execution of the instruction code 3 causes processing to jump to the coverage measurement program code. The coverage measurement program checks the execution address of the instruction code 3 and the state of a CPU flag to determine whether the TRUE branch or FALSE branch of the instruction code 4 immediately succeeding the instruction code 3 will be taken when the instruction code 4 is executed. Then, processing returns to the program under test after storing the determination result.

The determination result, that is, data as to which branch of the instruction code 4 has been taken, is stored in a table as shown in FIG. 5. Specifically, if it is the TRUE branch, the coverage measurement program increments the value in the field 1710 in the table by one to indicate the number of times the TRUE branch of the instruction code 4 has been taken. If, on the other hand, the CPU flag indicates the FALSE branch, the coverage measurement program increments the value in the field 1711 in the table by one to indicate the number of times the FALSE branch has been taken. It should be noted that such a table is often generated by a compiler, assembler, etc. when it inserts the instruction code 3.

Upon completion of the execution, the tested program is processed based on the above stored data and the results are output. When each instruction code of the measurement target program was generated using high-level language code through a language processor such as a compiler, some coverage measurement tools also output information for associating each processing statement in the high-level language code with the above stored data as to which branch was taken and how many times in order to increase the test efficiency. After completion of the test, the inserted jump instruction (the instruction code 3) for coverage measurement is deleted to restore the original program code shown in FIG. 3. Then, the program is shipped as a software product.

The above method for coverage measurement has the problem of involving CPU overhead since it inserts a jump instruction at a point immediately before each target conditional branch instruction and executes it to determine the coverage. This overhead significantly reduces the execution speed, making it difficult to test a program which requires real-time processing. As a result, the test produces only reduced effect. This problem also arises with C0 coverage measurement.

Further, a conventional coverage measurement tool performs coverage measurement on the same branch repeatedly (that is, stores the number of times the branch has been taken) even when the branch is frequently taken. Repeated measurement on such a branch, that is, storing the number of times such a branch has been taken, is often unnecessary. The reason for this is that the calculation of C0 coverage or C1 coverage of a branch only requires information on whether the branch has ever been taken at least once (it does not matter how many times it has been taken). It is often unnecessary to check the same measurement point more than once. That is, preventing repeated measurement on branches that are frequently taken may lead to a reduction in the measurement time and an increase in the efficiency of the debugging process.

It should be noted that even though Patent Documents 1 to 3 each propose some technique for reducing the time required for coverage measurement, they do not satisfy the requirement of preventing repeated measurement on branches which are frequently taken.

It is, therefore, an object of the present invention to provide a method for testing a program, capable of preventing repeated measurement on branches that are frequently taken and thereby avoiding unnecessary overhead.

SUMMARY OF THE INVENTION

The present invention provides a technique for testing a program, which initially counts the number of times each instruction, or at least each branch instruction, of the program has been executed, but stops counting when the count has reached a predetermined value.

The present invention can avoid counting the number of times each branch has been taken when the count has reached a desired value and thereby eliminate unnecessary overhead.

BRIEF DESCRIPTION OF THE DRAWINGS

FIG. 2 is a diagram showing an exemplary structure of a measurement target program;

FIG. 3 is a diagram showing an exemplary original structure of the measurement target program;

FIG. 4 is a diagram showing an exemplary conventional structure of the measurement target program;

FIG. 5 is a diagram showing the configuration of a measurement record table according to the embodiment;

FIGS. 6(a) and 6(b) are diagrams showing the configuration of a measurement condition setting table according to the embodiment.

DESCRIPTION OF THE PREFERRED EMBODIMENTS

A preferred embodiment of the present invention will be described with reference to the accompanying drawings.

First Embodiment

Figure 1:
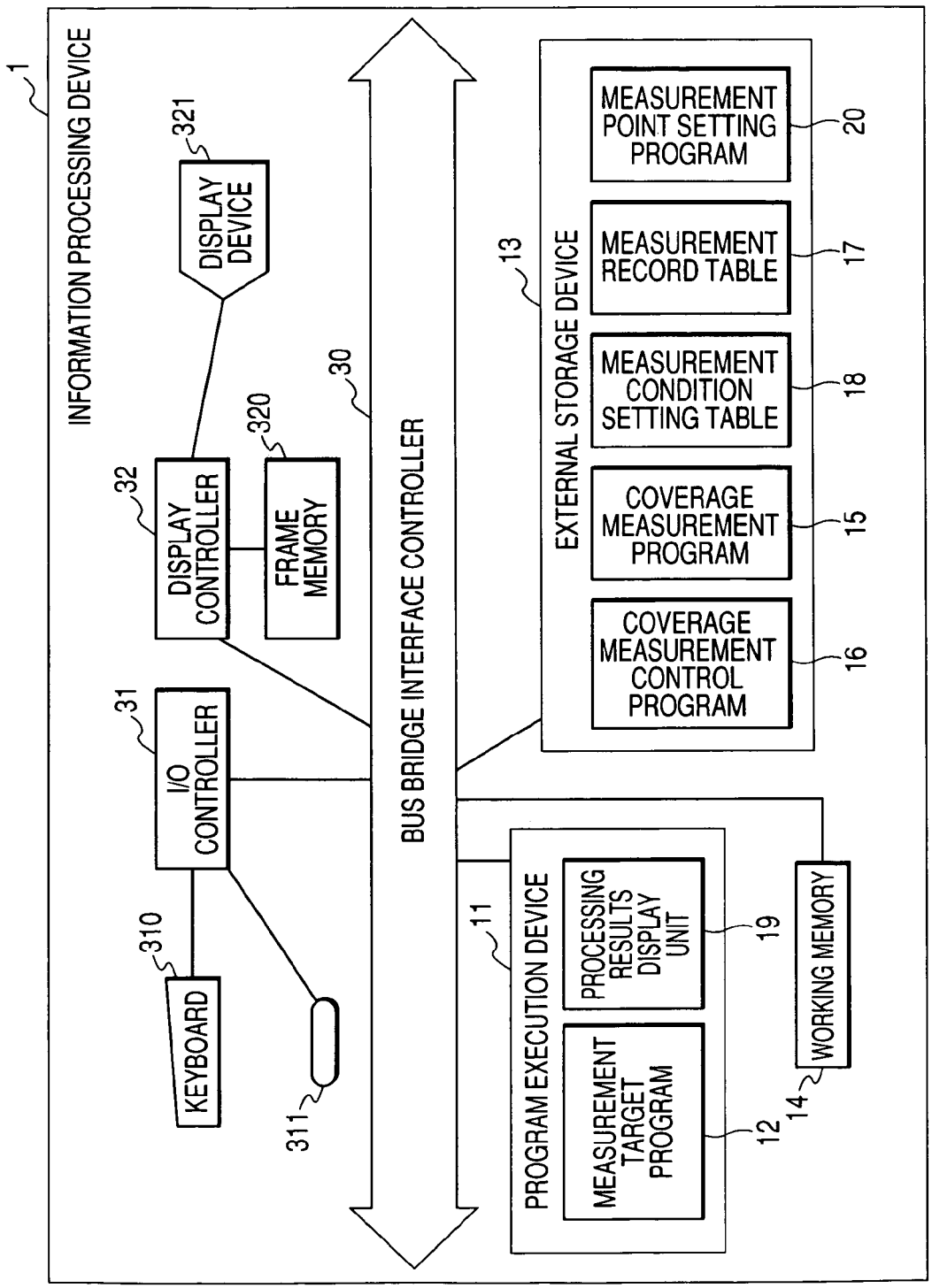
FIG. 1 is a diagram showing the configuration of an information processing device according to an embodiment of the present invention.

FIG. 1 shows a system configuration according to a first embodiment of the present invention. Referring to the figure, an information processing device 1 includes a program execution device 11 for executing a measurement target program 12. The measurement target program 12 is subjected to coverage measurement.

The program execution device 11 includes a CPU and memory and executes the OS, an interpreter program, and other programs stored in the memory.

Still referring to FIG. 1, the information processing device 1 also includes an external storage device 13 and working memory 14. The external storage device 13 stores various programs and data and may be a disk drive, a memory card, magnetic tape, or the like. According to the present embodiment, the external storage device 13 stores the measurement target program 12, a coverage measurement program 15, a coverage measurement control program 16, a measurement point setting program 20, a measurement record table 17, and a measurement condition setting table 18, as described later.

The working memory 14 is where the program execution device 11 stores the above various programs and data copied from the external storage device 13 when the program execution device 11 executes these programs. The working memory 14 is typically made up of a storage medium having a relatively high access speed. For example, a portion of the DRAM memory within the program execution device 11 may be used as the working memory 14. However, a low speed device, such as a disk drive, a memory card, or magnetic tape, can be used as the working memory 14.

The coverage measurement program 15 performs coverage measurement and has a function to count and store the number of times each executive instruction has been executed and calculate the coverage, which is equivalent to the function of known coverage measurement tools.

The coverage measurement control program 16 controls whether to activate the coverage measurement program 15 at each measurement point. The coverage measurement control program 16 and the measurement condition setting table 18 described later are components unique to the present invention. The present embodiment is characterized in that the coverage measurement program 15 is only activated through the coverage measurement control program 16 under conditions indicated in the measurement condition setting table 18.

The coverage measurement control program 16 has a function to determine whether to activate the coverage measurement program 15, as well as a function to activate the coverage measurement program 15 as necessary. The coverage measurement control program 16 checks data in the measurement record table 17 described later, in the measurement condition setting table 18, and in the conditional decision results display unit 191 described later to determine whether to activate the coverage measurement program 15.

Based on the determination result, the coverage measurement program 16 performs one of the following two operations:

(a) The coverage measurement program 16 first activates the coverage measurement program 15 so that the coverage measurement program 15 can perform coverage measurement, and then terminates itself.

(b) The coverage measurement program 16 terminates itself without any processing. No coverage measurement is carried out since the coverage measurement program 16 terminates itself without activating the coverage measurement program 15.

The measurement record table 17 is a table in which the coverage measurement control program 16 stores coverage information on the measurement target program 12. The measurement condition setting table 18 stores conditions under which to obtain coverage information on the measurement target program 12. As described above, the coverage measurement control program 16 determines whether to activate the coverage measurement program 15 based on data in the measurement record table 17 and in the measurement condition setting table 18.

The program execution device 11 also includes a processing results display unit 19, which is made up of the conditional decision results display unit 191 and a return address display unit 192 (not shown in FIG. 1).

The conditional decision results display unit 191 is made up of a flip-flop, a register, or a storage area for indicating a conditional decision result. The program execution device 11 performs conditional branch processing, etc. based on the conditional decision result. According to the present embodiment, the conditional decision results display unit 19 continues to display the conditional decision result until the target conditional branch instruction is executed. The display is reset to its initial state only after the conditional branch instruction has been executed. The return address display unit 192 is made up of a register or a storage area for storing the return address from a function call, etc.

The program execution device 11 stores and runs the measurement point setting program 20 in its memory. The measurement point setting program 20 has a function to process the measurement target program 12 so that the measurement target program 12 can be subjected to coverage measurement unique to the present invention.

Further, the information processing device 1 also includes components of a general information processing device. In FIG. 1, these components are an I/O controller 31, a display controller 32, and devices such as a keyboard 310, a mouse 311, frame memory 320, and a display device 321 which are controlled by the controllers. Further, the information processing device 1 is configured such that the component devices are connected to one another through a bus bridge interface controller 30 for data exchange.

FIG. 2 is a diagram showing the structure of the measurement target program 12 according to the present embodiment. FIG. 3 shows the original structure of the measurement target program 12 before it is processed for coverage measurement. FIG. 4 shows an exemplary conventional structure of the measurement target program 12.

The measurement target program 12 is made up of a plurality of instruction codes. These instruction codes are not limited to statements of a specific language. For example, they may be of a machine language, an interpreter intermediate language, etc. Alternatively, each instruction code may be a single processing statement of a high-level language such as the C language.

Referring to FIG. 2, the instruction code 4 causes processing to jump to LABEL002 only when a prescribed condition is met (TRUE). When the instruction code 4 is checked, the program execution device 11 determines whether or not to jump by checking the conditional decision results display unit 191.

Further, the instruction code 3 in FIG. 2 causes processing to jump to the code of the coverage measurement control program 16. That is, execution of the instruction code 3 causes the coverage measurement control program 16 to be activated, which then determines whether the TRUE branch or the FALSE branch of the conditional branch instruction (the instruction code 4) immediately succeeding the instruction code 3 will be taken when the instruction is executed, and stores the determination result. The instruction code 3 is added to the original program as shown in FIG. 3 to measure the coverage of the conditional branches of the instruction code 4. The instruction code 3 can be a software interrupt instruction. However, the following description assumes it to be a jump instruction, or branch instruction, with a link. A jump instruction with a link causes processing to jump after storing the return address. When processing returns from a function, etc., the stored return address is transferred to the program counter (PC).

The present embodiment employs the return address display unit 192 to store the return address. Referring to the program shown in FIG. 2, upon execution of the instruction code 3 by the program execution device 11, it stores the location in the return address display unit 192, i.e., storing the address, of the instruction code 4, which is subjected to coverage measurement.

The coverage measurement control program 16 can recognize the instruction code 4 as a measurement target by checking the return address display unit 192, since the return address display unit 192 stores the address of the measurement target. The coverage measurement control program 16 then determines whether the TRUE branch or FALSE branch of the instruction code 4 will be taken, or whether or not to jump, by checking the conditional decision result (TRUE or FALSE) displayed on the conditional decision results display unit 191, and stores the determination result.

After the coverage measurement control program 16 has performed coverage measurement on the instruction code 4, processing returns to the address indicated by the return address display unit 192, that is, the address of the instruction code 4. Then, the program execution device 11 executes the instruction code 4.

It should be noted that the measurement point setting program 12 has processed the original measurement target program 12 shown in FIG. 3 into the measurement target program 12 shown in FIG. 2.

Thus, in known coverage measurement, for example, a jump instruction (instruction code 3) for jumping to the coverage measurement program 15 is added to the original measurement target program 12 in FIG. 3 generated during program compilation or assembly, producing the measurement target program 12 shown in FIG. 4, which is executed by the program execution device 11 to cause the coverage measurement program 15 to perform coverage measurement.

According to the present embodiment, however, the measurement point setting program 20 processes the measurement target program 12 shown in FIG. 4 such that the instruction code 3 is replaced by a jump instruction code to the coverage measurement control program 16. The present embodiment is characterized by this new instruction code 3 for jumping to the coverage measurement control program 16. Therefore, in the present embodiment, execution of the instruction code 3 causes the coverage measurement control program 16 to be called, whereas in a known conventional coverage measurement system, execution of the instruction code 3 causes the coverage measurement program 15 to be directly called.

FIG. 5 shows the configuration of the measurement record table 17 according to the present embodiment. This measurement record table is equivalent to that used by known coverage measurement tools. The coverage measurement program 15 uses the measurement record table 17 to store the number of times each executive instruction has been executed, which is referred to in this specification as the "pass count". In FIG. 5, the instruction code 4 shown in FIG. 2 is registered as being at measurement point 1.

The measurement record table 17 is configured such that when the instruction at a measurement point is a conditional branch instruction such as the instruction code 4, the pass count 171 can be set separately for each of the TRUE and FALSE branches of the conditional branch instruction, as shown in FIG. 5. In addition, each record in the measurement record table 17 includes a measurement point number 172, an address 173, an instruction code number 174, and a branch 175. The address 173 indicates the location of the instruction code 174 at the measurement point 172. The table shown in FIG. 5 indicates that the instruction code 4 shown in FIG. 2 is located at 00010000H. It should be noted that if it is only necessary to indicate whether each branch has ever been taken at least once, the pass count field 171 may store some symbol, instead of a count, representing such information.

The coverage measurement program 15 updates the pass count fields 1710 and 1711 for the measurement point 1 in the following manner. Assume that the conditional decision results display unit 191 is indicating TRUE and the return address display unit 192 is indicating the address of the instruction code 4. In such a case, the coverage measurement program 15 increments the numerical value in the field 1710 by one to indicate the number of times the TRUE branch of the instruction code 4 has been taken or the pass count for the TRUE branch. If, on the other hand, the conditional decision results display unit 191 is indicating FALSE, the coverage measurement program 15 increments the value in the field 1711 by one to indicate the number of times the FALSE branch of the instruction code 4 has been taken or the pass count for the FALSE branch. In the above cases, if it is only necessary to indicate whether each branch has ever been taken at least once, the coverage measurement program 15 overwrites the field 1710, or field 1711, with some symbol to indicate that the TRUE branch, or the FALSE branch, has been taken.

The measurement record table 17 in FIG. 5 shows that the number of times the TRUE branch of the instruction code 4 has been taken or the pass count for the TRUE branch is 1 and the number of times the FALSE branch has been taken or the pass count for the FALSE branch is 0. The C0 and C1 coverages of the portion of the measurement target program 12 shown in FIG. 2 are calculated based on the above data in the measurement record table 17 as below.

The number of unexecuted instruction codes is 1 (only the instruction code 5) and the number of executed instruction codes is 4 (the instruction codes 1, 2, 4, and 6).

Therefore:

C0 coverage=(number of executed instruction codes)/ (total number of instruction codes)=(5-1)/5=80%, and C1 coverage=50%.

On the other hand, if the value in the field 1710=0 and the value in the field 1711>0, then there is no unexecuted instruction code.

Therefore:

C0 coverage=(5-0)/5=100% and

C1 coverage=50%.

It should be noted that the measurement record table 17 is typically generated by a compiler, assembler, etc. when the measurement target program 12 shown in FIG. 3 is transformed into the measurement target program 12 shown in FIG. 4. The present embodiment also generates the measurement record table 17 in such a manner.

FIGS. 6(*i* a) and 6(*b*) show the configuration of the measurement condition setting table 18 according to the present embodiment. The coverage measurement control program 16 checks this table to determine whether to perform coverage measurement.

The measurement condition setting table 18 is configured such that when the instruction at a measurement point is a conditional branch instruction such as the instruction code 4, the maximum allowable number of measurements 181 can be set separately for each of the TRUE and FALSE branches of the conditional branch instruction, as shown in FIG. 6(*a*). In addition, each record in the measurement condition setting table 18 includes a measurement point number 172, an address 173, an instruction code number 174, and a branch 175. The address 173 indicates the location of the instruction code 174 at the measurement point 172. The table shown in FIG. 6(*a*) indicates that the instruction code 4 shown in FIG. 2 is located at 00010000H.

The "maximum allowable number of measurements" field 181 typically stores the maximum allowable number of measurements set for each measurement point. In the case of the measurement point 1 shown in FIG. 6(*a*), the maximum allowable number of measurements is set at "1" for each of the TRUE and FALSE branches of the instruction. If no maximum is to be placed on the allowable number of measurements at each measurement point, a value (e.g., -1) indicating that there is no maximum limit is stored in the "maximum allowable number of measurements" field 181.

The repeated-measurement-at-all-points flag 186 (FIG. 6(*b*)) is set to ON when coverage measurement is to be repeatedly performed at all measurement points. That is, when this flag is set to ON, the present embodiment performs the same operation as known coverage measurement tools.

It should be noted that when the maximum allowable number of measurements 181 at each measurement point is 1, there is no need for the "maximum allowable number of measurements" field 181 and hence the measurement condition setting table 18 itself.

A description will be given below of the processing operation of the present embodiment configured as shown in FIGS. 1 to 6.

First, a description will be given of the operation performed when no maximum is placed on the allowable number of measurements at each measurement point, which is achieved by setting the repeated-measurement-at-all-points flag 186 in the measurement condition setting table 18 to ON. In this operation, the program execution device 11 executes the instruction code 3, as in known coverage measurement operation.

Immediately after the program execution device 11 executes the instruction code 3 shown in FIG. 2, the coverage measurement control program 16 takes control. The coverage measurement control program 16 checks the repeated-measurement-at-all-points flag 186 in the measurement condition setting table 18. Upon determining that the repeated-measurement-at-all-points flag 186 is set to ON, the coverage measurement control program 16 activates the coverage measurement program 15. The activated coverage measurement program 15 performs processing for predetermined known coverage measurement.

An exemplary initial step in conducting the predetermined coverage measurement is to update the pass count. Specifically, the coverage measurement program 15 updates (increments) the pass count field 171 in the measurement record table 17. For example, assume that the conditional decision results display unit 191 is indicating TRUE and the return address display unit 192 is indicating the address of the instruction code 4. In such a case, the coverage measurement program 15 increments the numerical value in the field 1710 by one to indicate the number of times the TRUE branch of the instruction code 4 has been taken. If, on the other hand, the conditional decision results display 191 is indicating FALSE, the coverage measurement program 15 increments the value in the field 1711 by one to indicate the number of times the FALSE branch of the instruction code 4 has been taken. If it is only necessary to indicate whether each branch has ever been taken at least once, the coverage measurement program 15 overwrites the field 1710, or field 1711, with some symbol instead of incrementing the numerical value to indicate that the TRUE branch, or the FALSE branch has been taken.

The coverage measurement program 15 then calculates the C0 and C1 coverages based on the pass count data before ending this step. The C0 and C1 coverages are obtained as below.

For example, when the value in the field 1710>0 and the value in the field 1711=0, the number of unexecuted instruction codes is 1 (only the instruction code 5) and the number of executed instruction codes is 4 (the instruction codes 1, 2, 4, and 6).

Therefore:

C0 coverage=(number of executed instruction codes)/ (total number of instruction codes)=(5-1)/5=80%, and C1 coverage=50%.

On the other hand, when the value in the field 1710=0 and the value in the field 1711>0, there is no unexecuted instruction code.

Therefore:

C0 coverage=(5-0)/5=100%, and

C1 coverage=50%.

Upon completion of the processing by the coverage measurement program 15, the coverage measurement control program 16 takes control and terminates itself immediately. The above series of coverage measurement steps produces results equivalent to those obtained from known coverage measurement steps.

Figure 7:
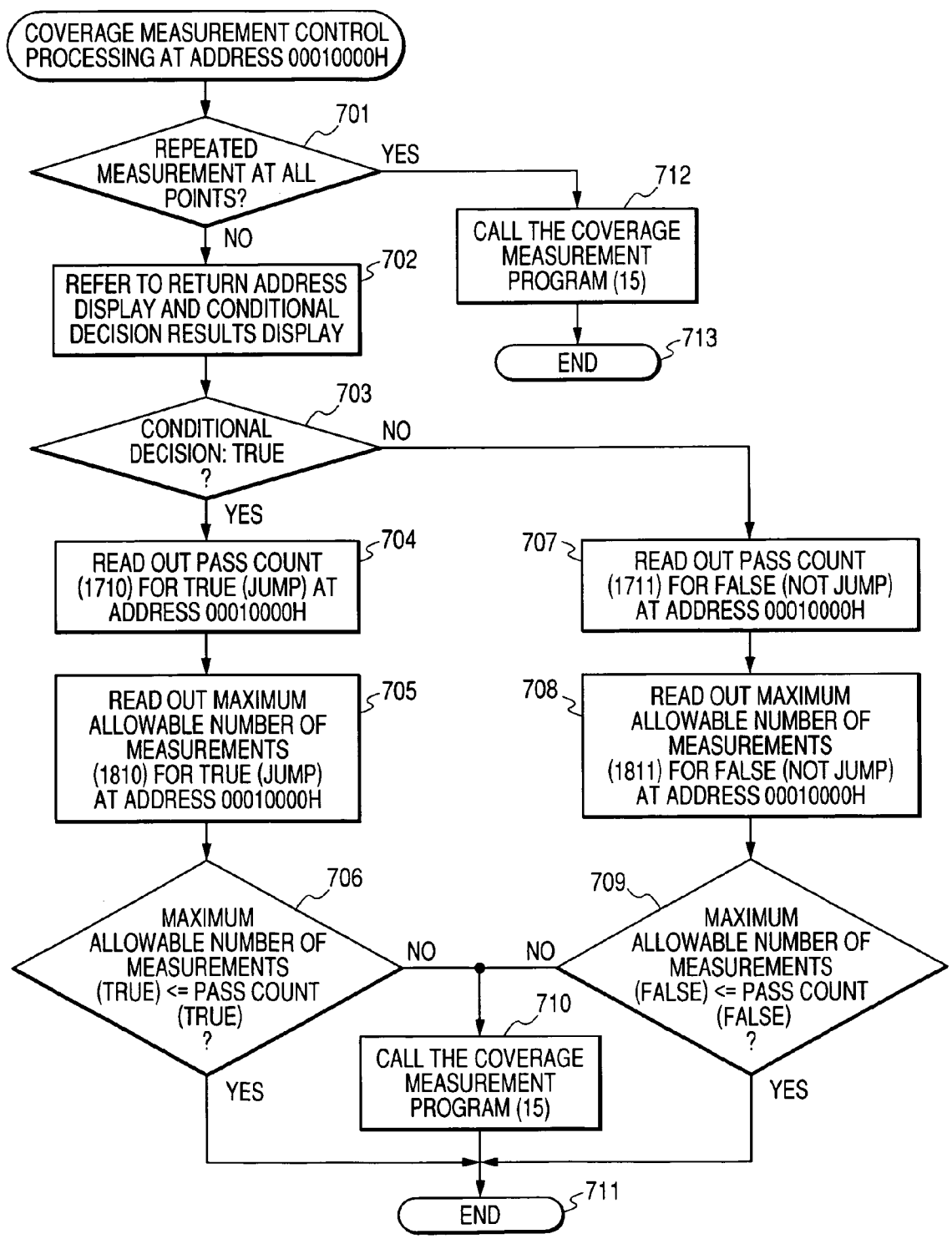
FIG. 7 is a diagram showing the processing procedure performed by a coverage measurement control program according to the embodiment.

With reference to FIG. 7, a description will be given below of the operation performed when an upper limit is placed on the allowable number of measurements at each measurement point. FIG. 7 shows an exemplary procedure for performing a coverage measurement control unique to the present embodiment.

At step 701, the coverage measurement control program 16 checks the repeated-measurement-at-all-points flag 186 in the measurement condition setting table 18 and determines that the flag is set to OFF. Then, since an upper limit is placed on the allowable number of measurements at each measurement point, instead of performing the known coverage measurement procedure as described above, the coverage measurement control program 16 performs the following processing without immediately activating the coverage measurement program 15. The following description assumes that the return address display unit 192 is indicating the address 00010000H, and the instruction code 4, which is the conditional branch instruction to be checked, is located at this address.

At step 702, the coverage measurement control program 16 first obtains the decision result stored in the conditional decision results display unit 191 and the return address stored in the return address display unit 192. The coverage measurement control program 16 determines the obtained return address to be 00010000H and further determines whether the conditional decision result indicates TRUE or FALSE (step 703).

If the conditional decision result indicates TRUE, at steps 704 and 705 the coverage measurement control program 16 accesses both the measurement record table 17 and the measurement condition setting table 18 to read out the pass count 1710 for the TRUE branch of the branch instruction at the measurement point having the above address and the maximum allowable number of measurements 1810 set for the TRUE branch. The coverage measurement control program 16 compares the obtained pass count 1710 and maximum allowable number of measurements 1810 at step 706. Alternatively, the coverage measurement control program 16 determines whether the pass count field 1710 stores any symbol indicating that the branch was previously taken. Alternatively, if the maximum allowable number of measurements 1810 is decremented by one each time the branch is taken, the coverage measurement control program 16 determines whether the maximum allowable number of measurements 1810 has reached zero.

If the maximum allowable number of measurements $\leqq$ the pass count, or if the pass count field stores some symbol indicating that the branch was previously taken, measurement on the TRUE branch at this measurement point need not be carried out. Therefore, the coverage measurement control program 16 does not call the coverage measurement program 15 and terminates itself immediately at step 711 without any further processing.

If the maximum allowable number of measurements>the pass count, or if the pass count field does not store any symbol indicating that the branch was previously taken, measurement on the TRUE branch at this measurement point need be carried out. Therefore, the coverage measurement control program 16 calls the coverage measurement program 15 before it terminates itself (steps 710 and 711).

On the other hand, if the conditional decision result obtained from the conditional decision results display unit 191 indicates FALSE at step 703, the coverage measurement control program 16 accesses both the measurement record table 17 and the measurement condition setting table 18 and reads out the pass count 1711 for the FALSE branch of the branch instruction at the measurement point having the above address and the maximum allowable number of measurements 1811 set for the FALSE branch (steps 707 and 708). The coverage measurement control program 16 compares the obtained pass count 1711 with the maximum allowable number of measurements 1811 at step 709. Alternatively, the coverage measurement control program 16 determines whether the pass count field 1711 stores any symbol indicating that the branch was previously taken. Alternatively, if the maximum allowable number of measurements 1811 is decremented by one each time the branch is taken, the coverage measurement control program 16 determines whether the maximum allowable number of measurements 1811 has reached zero.

If the maximum allowable number of measurements$\leqq$the pass count, or if the pass count field stores some symbol indicating that the branch was previously taken, measurement on the FALSE branch at this measurement point need not be carried out. Therefore, the coverage measurement control program 16 does not call the coverage measurement program 15 and terminates itself immediately at step 711 without any further processing.

If, on the other hand, the maximum allowable number of measurements > the pass count, or if the pass count field does not store any symbol indicating that the branch was previously taken, measurement on the FALSE branch at this measurement point need be carried out. Therefore, the coverage measurement control program 16 calls the coverage measurement program 15 before it terminates itself (steps 710 and 711).

It should be noted that if an interpreter program traces the instruction codes 1, 2, 4, 5, and 6 shown in FIG. 2, it may call the coverage measurement program 16 each time an instruction code is checked. Whether the coverage measurement program 16 calls the coverage measurement program 15 depends on the determination at steps 701 and 706. In such a case, when checking the instruction codes 1, 2, 5, and 6, the coverage measurement control program 16 skips steps 702 and 703 and then performs steps 704, 705, 706, and 710, since these instructions are not branch instructions. In this case, the instruction code 3 may or may not be inserted into the measurement target program 12.

As described above, the present embodiment avoids counting the number of times each branch has been taken, or the pass count of each branch, when the count has reached a predetermined value or the maximum allowable number of measurements. This eliminates unnecessary measurement and thereby reduces measurement overhead.

It should be noted that the present embodiment maximizes the function of the coverage measurement program 15, which is a known coverage measurement program, allowing the coverage measurement program 15 to perform processing such as calculating coverage after measuring pass counts and associating each processing statement of high-level language code with obtained pass count data.

That is, the coverage measurement program 15 performs known coverage calculation processing using pass count data obtained as described above.

Further, when each instruction code of the measurement target program 12 is generated using high-level language codes through a language processor such as a compiler, the known coverage measurement program 15 may generate information for associating each processing statement in the high-level language code with the pass count data, as well as calculating the coverage, if the coverage measurement program 15 has such a function.

As a result, the coverage measurement control program 16, which is unique to the present embodiment, can be realized by compact processing and hence can be implemented at reduced cost.

According to the present embodiment described above, the measurement record table 17 is accessed by both the coverage measurement program 15 and the coverage measurement control program 16. However, a table equivalent to the measurement record table 17 may be provided and dedicated to the coverage measurement control program 16 separately from the measurement record table 17.

Further, the measurement record table 17 and the measurement condition setting table 18 employed by the present embodiment described above may be combined into a single table since they store duplicate data. Further, the measurement record table 17 may be omitted if the pass count field 171 is not provided and the value in the "maximum allowable number of measurements" field 181 is decremented by one each time the instruction is executed. Further, the measurement condition setting table 18 may also be omitted if all instructions have their maximum allowable number of measurements 181 set to 1.

Further according to the present embodiment described above, the program execution device 11 copies various components stored in the external storage device 13 such as a hard disk or the like to its memory or the working memory 14 and then executes or references these components. However, the program execution device 11 may copy these components from an external storage medium such as a CD-ROM or a flexible disk or from semiconductor memory such as flash EEPROM, or other storage media. Further, these components may be externally obtained through data communications and stored in some storage medium. Further, the present invention is not limited to the embodiment described above, and various alterations may be made thereto without departing from the spirit and the scope of the invention.

The present invention can be applied to any product with built-in software in order to increase the efficiency and accuracy of its development.

Having described a preferred embodiment of the invention with reference to the accompanying drawings, it is to be understood that the invention is not limited to the embodiment and that various changes and modifications could be effected therein by one skilled in the art without departing from the spirit or scope of the invention as defined in the appended claims.

What is claimed is:

1. A method for carrying out a coverage measurement on a test target program, which includes jump instruction codes and non-jump instruction codes, said method comprising:
    branching to a coverage measurement control program by executing a branch instruction inserted in the test target program;
    determining by said coverage measurement control program whether a number of times an instruction code next to the branch instruction in the test target program was executed has reached a predetermined number of times;
    if the predetermined number of times has not been reached, executing a coverage measurement program to increment the number of times said instruction code was executed; and
    if the predetermined number of times has been reached, suppressing both the execution of said coverage measurement program and the incrementing operation.

2. The method as claimed in claim 1, wherein said instruction code is a conditional jump instruction, and said coverage measurement control program obtains a result of a conditional decision made before executing the conditional jump instruction to determine whether a number of times the conditional jump instruction with the conditional decision result obtained has reached the predetermined number of times.

3. The method as claimed in claim 1, wherein an address of said instruction code is preserved as a return address to the test target program when executing said branch instruction.

4. A computer readable medium having program code recorded thereon for execution on an information processing device for carrying out a coverage measurement on a test target program, which includes jump instruction codes and non-jump instruction codes, said program code, which includes a coverage measurement control program and a coverage measurement program, causing the information processing device to perform the following method:
    branching to said coverage measurement control program by executing a branch instruction inserted in the test target program;
    determining by said coverage measurement control program whether a number of times an instruction code next to the branch instruction in the test target program was executed has reached a predetermined number of times;
    if the predetermined number of times has not been reached, executing said coverage measurement program to increment the number of times said instruction code was executed; and
    if the predetermined number of times has been reached, suppressing both the execution of said coverage measurement program and the incrementing operation.

5. The computer readable medium as claimed in claim 4, wherein said instruction code is a conditional jump instruction, and said coverage measurement control program obtains a result of a conditional decision made before executing the conditional jump instruction to determine whether a number of times the conditional jump instruction with the conditional decision result obtained has reached the predetermined number of times.

6. The computer readable medium as claimed in claim 4, wherein an address of said instruction code is preserved as a return address to the test target program when executing said branch instruction.

7. A information processing device for carrying out a coverage measurement on a test target program, which includes jump instruction codes and non-jump instruction codes, said information processing device comprising:
- a CPU;
- a memory unit;
- a program execution unit for executing the test target program and for transferring control to a coverage measurement control unit when executing a branch instruction inserted in the test target program;
- the coverage measurement control unit for determining whether a number of times an instruction code next to the branch instruction in the test target program was executed has reached a predetermined number of times; and
- a coverage measurement unit, activated by the coverage measurement control unit, for incrementing the number of times said instruction code was executed if the predetermined number of times has not been reached,
- wherein said coverage measurement control unit suppresses both the activation of said coverage measurement unit and the incrementing operation if the predetermined number of times has been reached.

8. The information processing device as claimed in claim 7, wherein said instruction code is a conditional jump instruction, and said coverage measurement control unit obtains a result of a conditional decision made before executing the conditional jump instruction to determine whether a number of times the conditional jump instruction with the conditional decision result obtained has reached the predetermined number of times.

9. The information processing device as claimed in claim 7, wherein an address of said instruction code is preserved as a return address to the test target program when executing said branch instruction.

* * * * *